United States Patent
Chen et al.

(10) Patent No.: US 10,021,685 B2
(45) Date of Patent: Jul. 10, 2018

(54) TECHNIQUES FOR ALLOCATING RESOURCES IN LOW LATENCY WIRELESS COMMUNICATIONS

(71) Applicant: QUALCOMM Incorporated, San Diego, CA (US)

(72) Inventors: Wanshi Chen, San Diego, CA (US); Shimman Arvind Patel, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 15/264,839

(22) Filed: Sep. 14, 2016

(65) Prior Publication Data

US 2017/0188347 A1    Jun. 29, 2017

Related U.S. Application Data

(60) Provisional application No. 62/271,961, filed on Dec. 28, 2015.

(51) Int. Cl.
*H04W 72/04* (2009.01)
*H04L 5/00* (2006.01)

(52) U.S. Cl.
CPC ......... *H04W 72/044* (2013.01); *H04L 5/0048* (2013.01); *H04L 5/0058* (2013.01); *H04W 72/0406* (2013.01); *H04L 5/003* (2013.01)

(58) Field of Classification Search
CPC ............ H04W 72/044; H04W 72/0406; H04L 5/0048; H04L 5/0058
See application file for complete search history.

(56) References Cited

PUBLICATIONS

Catt., et al., "Analysis on Latency Reduction with TTI Shortening", 3GPP Draft, R2-153497, 3rd Generation Partnership Project (3gpp), Mobile Competence Centre, 650, Route Des Lucioles, F-06921 Sophia-Antipolis Cedex, France, vol. RAN WG2, No. Beijing, P.R.China, Aug. 24, 2015-Aug. 28, 2015, Aug. 23, 2015, XP051004209, 15 pages. Retrieved from the Internet: URL: http://www.3gpp.org/ftp/Meetings3GPPSYNC/RAN2/Docs/.

(Continued)

*Primary Examiner* — Ronald B Abelson
(74) *Attorney, Agent, or Firm* — Anthony R. Morris

(57) ABSTRACT

Various aspects described herein relate to allocating resources in wireless communications. A subset of resource block (RB) groups configured for a legacy wireless communication technology having a first transmission time interval (TTI) can be determined, where the first TTI is based on one subframe in duration, and where each RB group in the subset of RB groups includes one or more RBs. A resource allocation for a low latency communication technology having a second TTI, the second TTI being less than one subframe in duration, can be determined where the resource allocation including one or more low latency RBs in the subset of RB groups. Data can be communicated over resources in the one or more low latency RBs, the low latency RBs being based on the second TTI, and the resources being associated with the resource allocation.

30 Claims, 11 Drawing Sheets

(56) References Cited

PUBLICATIONS

Ericsson (Rapporteur) : "TR Text Proposal Capturing Outcome of [91#29] [LTE/Latency] and [91bis#04] [LTE/LATRED]", 3GPP Draft, R2-154929, TR TP Outcome of LTE Latency Evaluation Results, 3rd Generation Partnership Project (3gpp), Mobile Competence Centre, 650, Route Des Lucioles, F-06921 Sophia-Antipolis Cedex, vol. RAN WG2, No. Malmo, Sweden, Oct. 5, 2015-Oct. 9, 2015, Oct. 22, 2015, XP051042395, 39 pages. Retrieved from the Internet: URL :http://www.3gpp.org/ftp/tsgran/WG2RL2/TSGR291bis/Docs/.

Ericsson: "Study of shorter TTI for latency reduction", 3GPP Draft; R2-153493, 3rd Generation Partnership Project (3GPP), Mobile Competence Centre; 650, Route Des Lucioles; F-06921 Sophia-Antipolis Cedex ; Franc, vol. RAN WG2, No. Beijing, China; Aug. 24, 2015-Aug. 28, 2015 Aug. 14, 2015 (Aug. 14, 2015), XP050993915, 5 pages. Retrieved from the Internet: URL: http://www.3gpp.org/ftp/tsg_ran/WG2_RL2/TSGR2_91/Docs/[retrieved on Aug. 14, 2015].

Intel Corporation: "Protocol Impact of TTI Reduction", 3GPP Draft, R2-154296 Protocol Impact of TTI Reduction, 3rd Generation Partnership Project (3GPP) , Mobile Competence Centre. 650 , Route Des Lucioles. F-06921 Sophia-Antipolis Cedex. France, vol. RAN WG2, No. Malmo, Sweden, Oct. 5, 2015-Oct. 9, 2015, Oct. 4, 2015, XP051040273, 5 pages. Retrieved from the Internet: URL:http://www.3gpp.org/ftp/Meetings_3GPP_SYNC/RAN2/Docs/.

International Search Report and Written Opinion—PCT/US2016/058472—ISA/EPO—Feb. 2, 2017, 12 pages.

US 10,021,685 B2

TECHNIQUES FOR ALLOCATING RESOURCES IN LOW LATENCY WIRELESS COMMUNICATIONS

CLAIM OF PRIORITY UNDER 35 U.S.C. § 119

The present Application for Patent claims priority to Provisional Application No. 62/271,961 entitled "TECHNIQUES FOR ALLOCATING RESOURCES IN LOW LATENCY WIRELESS COMMUNICATIONS" filed Dec. 28, 2015, which is assigned to the assignee hereof and hereby expressly incorporated by reference herein for all purposes.

BACKGROUND

Described herein are aspects generally related to communication systems, and more particularly, to allocating resources is wireless communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, further improvements in LTE technology may be desired. Preferably, these improvements should be applicable to other multi-access technologies and the telecommunication standards that employ these technologies.

In LTE, there are three types of downlink resource allocation supported for allocating resources to a user equipment (UE): one allocation type (type 2) is based on virtually contiguous resource allocation with one resource block (RB) granularity; another allocation type (type 0) is based on RB groups (RBG) where each RBG includes a number of consecutive RBs based on the system bandwidth and a bitmap indicates sets of RBGs assigned to a UE; and another allocation type (type 1) is based on RBG subsets that may be shifted. In type 1 allocation, three fields can be communicated to the UE including a first field with ceiling(log 2(P)) bits used to indicate a selected RBG subset among RBG subsets (e.g., 2 bits for 20 megahertz (MHz)), a second field with one bit used to indicate a shift of the resource allocation span within a subset, and a third field used to indicate a bitmap where each bit addresses a single virtual RB in the selected RBG subset such that the most significant bit to least significant bit of the bitmap are mapped to the virtual RBs in increasing frequency order.

In wireless communication systems employing legacy LTE, a plurality of UEs served by a particular eNodeB may be scheduled resources for communicating with the eNodeB over one or more channels using transmission time intervals (TTI) on the order of a 1 millisecond subframe. As UE capabilities and demand for bandwidth increases, lower latency in communications may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method for wireless communications is provided. The method includes determining a subset of resource block (RB) groups configured for a legacy wireless communication technology having a first transmission time interval (TTI), the first TTI being based on one subframe in duration, where each RB group in the subset of RB groups includes one or more RBs. The method also includes determining a resource allocation for a low latency communication technology having a second TTI, the second TTI being less than one subframe in duration, the resource allocation including one or more low latency RBs in the subset of RB groups. The method further includes communicating data over resources in the one or more low latency RBs, the low latency RBs being based on the second TTI, and the resources being associated with the resource allocation.

In another example, an apparatus for wireless communications is provided. The apparatus includes a transceiver for communicating one or more wireless signals via one or more antennas, a memory configured to store instructions, and one or more processors communicatively coupled with the transceiver and the memory. The one or more processors are configured to determine a subset of RB groups configured for a legacy wireless communication technology having a first TTI, the first TTI being based on one subframe in duration. Each RB group in the subset of RB groups includes one or more RBs. The one or more processors are further configured to determine a resource allocation for a low latency communication technology having a second TTI, the second TTI being less than one subframe in duration, the resource allocation including one or more low latency RBs in the subset of RB groups, and to communicate data over resources in the one or more low latency RBs, the low latency RBs being based on the second TTI, and the resources being associated with the resource allocation.

In yet another example, an apparatus for wireless communications is provided. The apparatus includes means for determining a subset of RB groups configured for a legacy wireless communication technology having a first TTI, the first TTI being based on one subframe in duration. Each RB group in the subset of RB groups includes one or more RBs. The apparatus also includes means for determining a resource allocation for a low latency communication technology having a second TTI, the second TTI being less than one subframe in duration, the resource allocation including one or more low latency RBs in the subset of RB groups, and means for communicating data over resources in the one or more low latency RBs, the low latency RBs being based on the second TTI, and the resources being associated with the resource allocation.

In another example, a computer-readable medium including code executable by one or more processors for wireless communications is provided. The code includes code for determining a subset of RB groups configured for a legacy wireless communication technology having a first TTI, the first TTI being based on one subframe in duration. Each RB group in the subset of RB groups includes one or more RBs. The code also includes code for determining a resource allocation for a low latency communication technology having a second TTI, the second TTI being less than one subframe in duration, the resource allocation including one or more low latency RBs in the subset of RB groups, and code for communicating data over resources in the one or more low latency RBs, the low latency RBs being based on the second TTI, and the resources being associated with the resource allocation To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

In order to facilitate a fuller understanding of aspects described herein, reference is now made to the accompanying drawings, in which like elements are referenced with like numerals. These drawings should not be construed as limiting the present disclosure, but are intended to be illustrative only.

DETAILED DESCRIPTION

Figure 1:
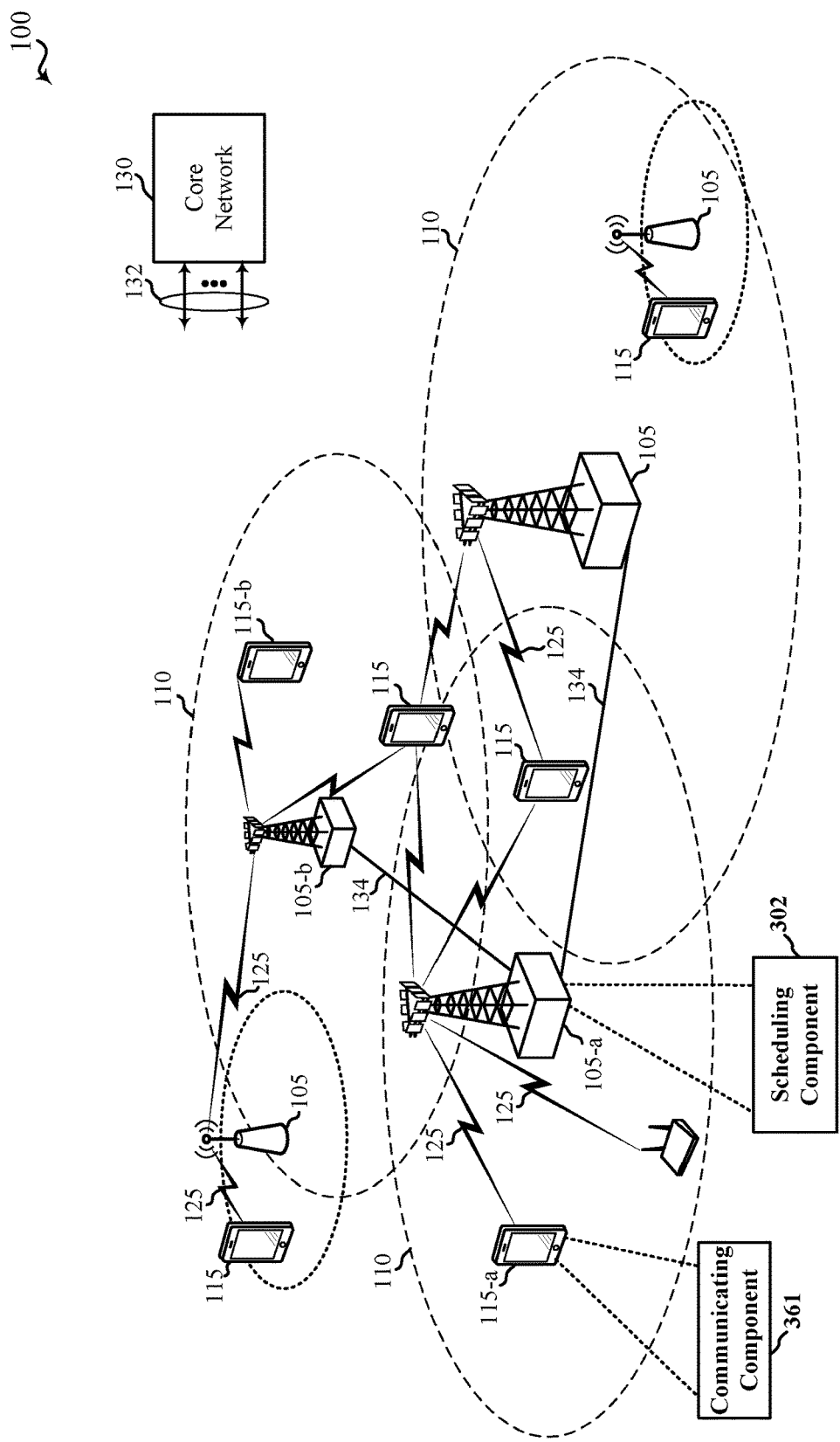
FIG. 1 shows a block diagram conceptually illustrating an example of a telecommunications system, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Described herein are various aspects related to generating and/or determining a resource allocation for low latency wireless communications. For example, a low latency communication technology, also referred to herein as an ultra-low latency (ULL) communication technology, may be based on a legacy wireless communication technology, such as third generation partnership project (3GPP) long term evolution (LTE), but may utilize different length transmission time intervals (TTI) (e.g., the ULL communication technology may have a shorter TTI duration than the legacy communication technology). For example, a legacy LTE technology may utilize a TTI having a duration of a subframe defined in LTE (e.g., 1 millisecond), where a ULL LTE technology can be based on a TTI having a duration less than a subframe (e.g., a division of a subframe, such as one symbol, two symbols, a subframe slot, etc.). In this regard, a lower latency in communications is achieved by the shorter, more frequent TTI.

Resource allocations for the ULL communication technology may be based on one or more aspects of resource allocation in the legacy communication technology. For example, a resource allocation for ULL communication technology may be based on resource blocks (RB) and/or RB groups (RBG) defined in the legacy communication technology. For example, an RB may refer to a portion of a frequency band in a system bandwidth for the legacy communication technology. For example, a 20 megahertz (MHz) LTE system may have 100 RBs within the 20 MHz. RBGs may refer to a portion of consecutive or non-consecutive RBs in the system bandwidth.

In a given TTI in the ULL communication technology, one or more low latency RBs can be generated and/or determined for a resource allocation. In one example, the one or more low latency RBs, which may also be referred to herein as a ULL block, are in one or more RB groups in a subset of RB groups configured for communication in the legacy communication technology. In another example, the one or more low latency RBs are in each RB group in a subset of RB groups configured for communication in the legacy communication technology. In one example, the one or more low latency RBs are in additional RB groups (e.g., consecutive RB groups) in additional subsets of RB groups configured for communication in the legacy communication technology.

Referring first to FIG. 1, a diagram illustrates an example of a wireless communications system 100, in accordance with aspects described herein. The wireless communications system 100 includes a plurality of access points (e.g., base stations, eNBs, or WLAN access points) 105, a number of user equipment (UEs) 115, and a core network 130. Access points 105 may include a scheduling component 302 configured to allocate resources for communicating with UEs 115 using a ULL communication technology. Similarly, one or more of UEs 115 may include a communicating component 361 configured to communicate with one or more access points 105 using the ULL communication technology (e.g., ULL LTE). Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples, a hybrid UE 115-a may communicate with access point 105-a on both a first hierarchical layer that supports first layer transmissions using a first TTI (which may relate to a "legacy communication technology") and a second hierarchical layer that supports second layer transmissions using a second TTI, which may be shorter than the first TTI (which may relate to a "ULL communication technology").

In other examples, a second layer UE 115-b may communicate with access point 105-b on the second hierarchical layer only. Thus, hybrid UE 115-a and second layer UE 115-b may belong to a second class of UEs 115 that may communicate on the second hierarchical layer, while legacy UEs 115 may belong to a first class of UEs 115 that may communicate on the first hierarchical layer only. Access point 105-b and UE 115-b may communicate on the second hierarchical layer through transmissions of subframes of the second subframe type. Access point 105-b may transmit communications related to the first or second hierarchical layer only or may transmit communications for both the first and second hierarchical layers. Where an access point 105-b supports both the first and second hierarchical layers, communicating component 361 can be configured to prioritize communications received from the access point 105-b that relate to the first and second hierarchical layers, as described herein.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies (RAT). The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In network communication systems using LTE/LTE-A and/or ULL LTE communication technologies, the terms evolved Node B (eNodeB or eNB) may be generally used to describe the access points 105. The wireless communications system 100 may be a Heterogeneous LTE/LTE-A/ULL LTE network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell may cover a relatively large geographic area (e.g., several kilometers in radius) and may allow unrestricted access by UEs 115 with service subscriptions with the network provider. A small cell may cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via one or more backhaul links 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communication links 125 may carry transmissions of each hierarchical layer which, in some examples, may be multiplexed in the communication links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. Hybrid UE 115-a, and/or second layer UE 115-b may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communications system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communication links 125 for LTE downlink transmissions for each hierarchical layer, while single carrier frequency division multiple access (SC-FDMA) communications signals may be used in the communication links 125 for LTE uplink transmissions in each hierarchical layer. Additional details regarding implementation of hierarchical layers in a system such as the wireless communications system 100, as well as other features and functions related to communications in such systems, are provided below with reference to the following figures.

Figure 2:
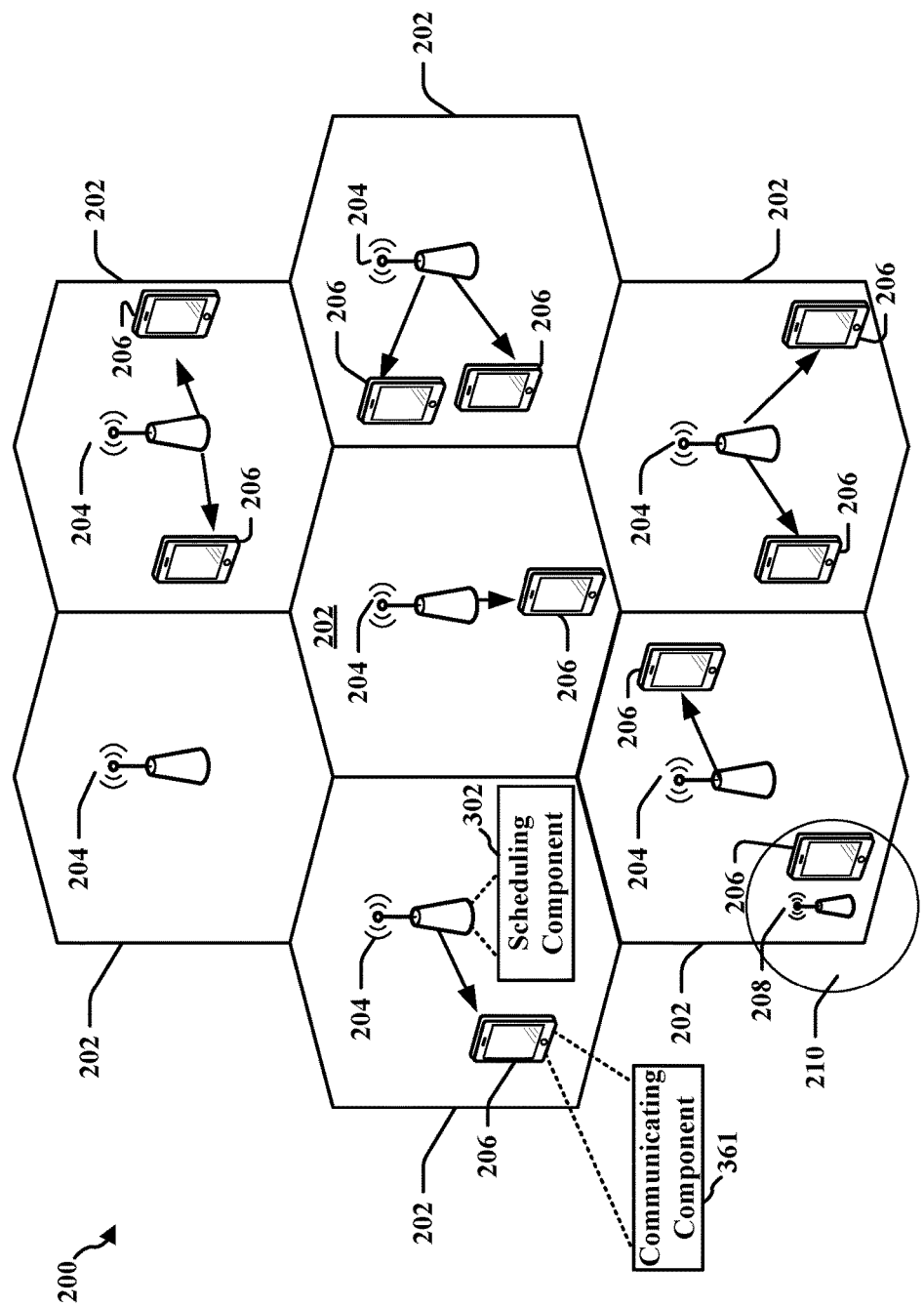
FIG. 2 is a diagram illustrating an example of an access network.

FIG. 2 is a diagram illustrating an example of an access network 200 in an LTE or ULL LTE network architecture. In this example, the access network 200 is divided into a number of cellular regions (cells) 202. One or more small cell eNBs 208 may have cellular regions 210 that overlap with one or more of the cells 202. The small cell eNBs 208 may provide one or more cells of a lower power class, such as a femto cell (e.g., home eNB (HeNB)), pico cell, micro cell, or remote radio head (RRH). The macro eNBs 204 are each assigned to a respective cell 202 and are configured to provide an access point to the core network 130 for all the UEs 206 in the cells 202. In an aspect, eNBs 204 and/or 208 may include scheduling component 302 configured to allocate resources for communicating with UEs 206 using a ULL communication technology. Similarly, one or more of UEs 206 may include a communicating component 361 configured to communicate with one or more eNBs 204 and/or 208 using the ULL communication technology (e.g., ULL LTE). There is no centralized controller in this example of an access network 200, but a centralized controller may be used in alternative configurations. The eNBs 204 are responsible for all radio related functions including radio bearer control, admission control, mobility control, scheduling, security, and connectivity to one or more components of core network 130.

The modulation and multiple access scheme employed by the access network 200 may vary depending on the particular telecommunications standard being deployed. In LTE or ULL LTE applications, OFDM may be used on the DL and SC-FDMA may be used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
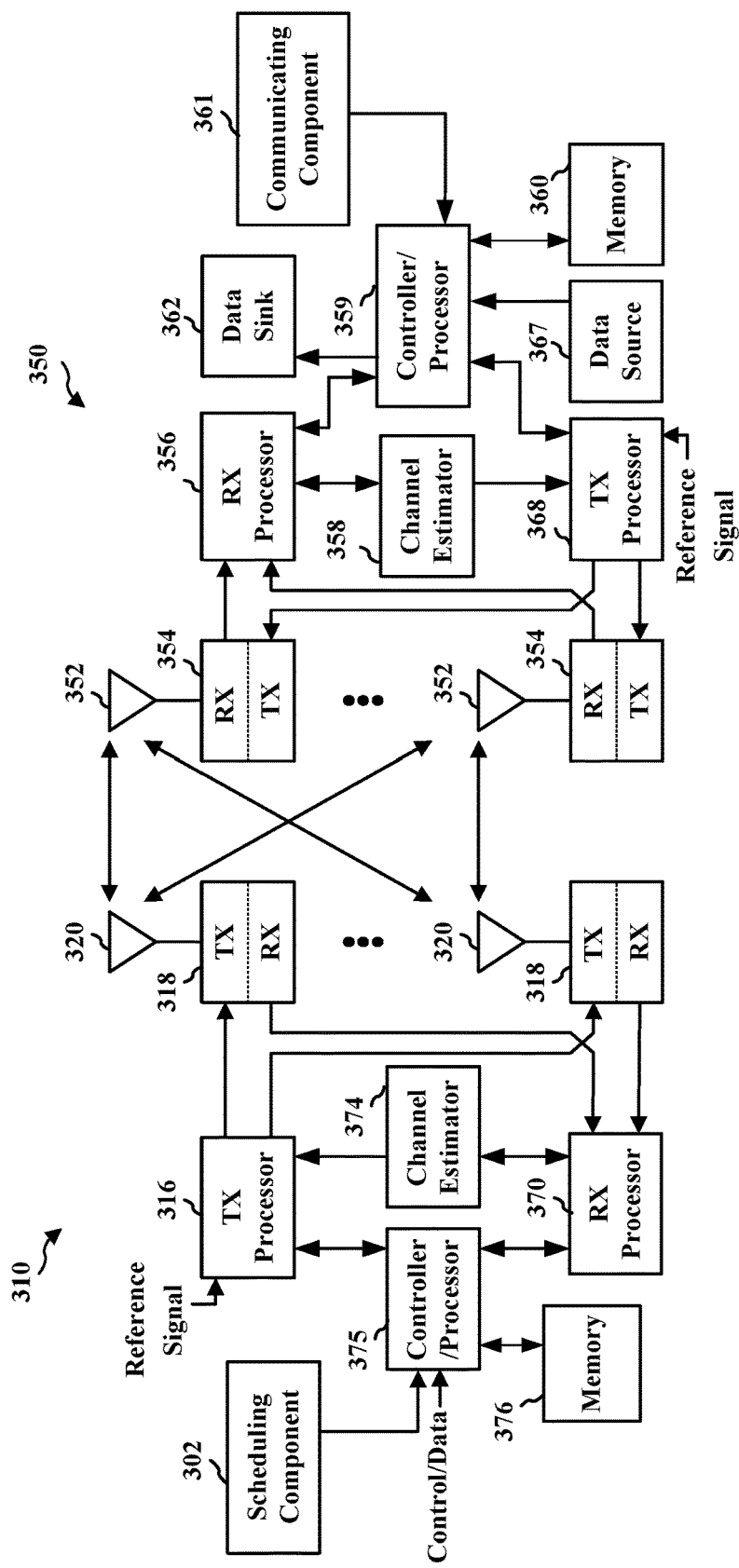
FIG. 3 is a diagram illustrating an example of an evolved Node B and user equipment in an access network.

FIG. 3 is a block diagram of an eNB 310 in communication with a UE 350 in an access network. In the DL, upper layer packets from the core network are provided to a controller/processor 375. The controller/processor 375 implements the functionality of the L2 layer. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for the L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot signal) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission. In addition, eNB 310 may include scheduling component 302 configured to allocate resources for communicating with a UE 350 using a ULL communication technology. Though scheduling component 302 is shown as coupled with controller/processor 375, substantially any processor of an eNB 310 can provide the functions of the scheduling component 302 and/or its related components described herein (e.g., in conjunction with controller/processor 375, memory 376, or otherwise). For example, TX processor 316 and/or RX processor 370 can additionally or alternatively provide one or more functions of scheduling component 302, as described herein.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations. In addition, communicating component 361 configured to communicate with one or more access points 105 using the ULL communication technology (e.g., ULL LTE). Though communicating component 361 is shown as coupled with controller/processor 359, substantially any processor of a UE 350 can provide the functions of the communicating component 361 and/or its related components described herein (e.g., in conjunction with controller/processor 359, memory 360, or otherwise). For example, TX processor 368 and/or RX processor 356 can additionally or alternatively provide one or more functions of communicating component 361, as described herein.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
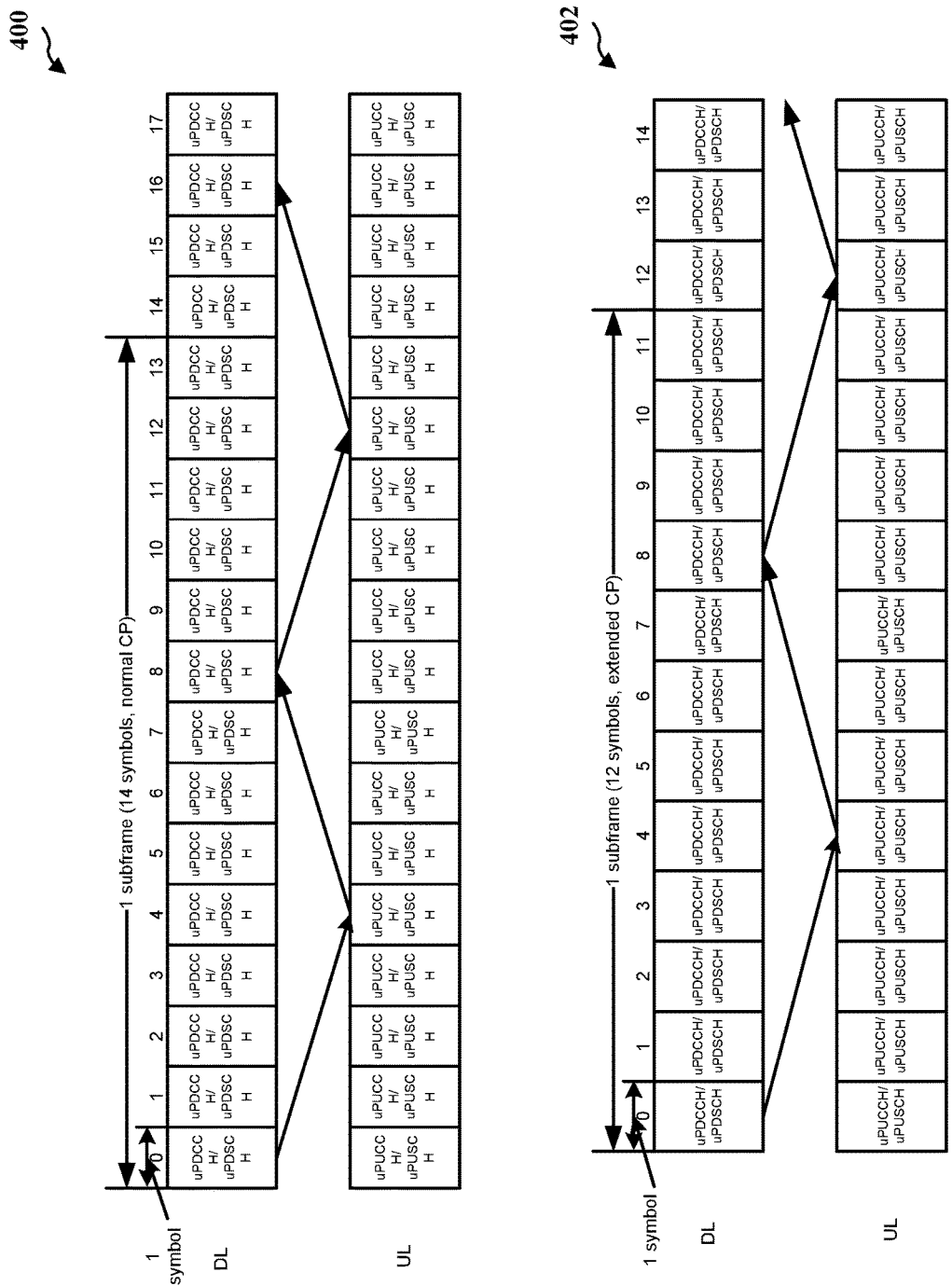
FIG. 4 is a diagram illustrating examples of timelines for ultra low latency (ULL) bandwidth allocation.

FIG. 4 is a diagram illustrating non-limiting examples of a ULL timelines 400, 402, with time progression extending from left to right in the figure, for managing ULL communications in a wireless communication system. In this example, timelines 400, 402 include ULL frames of symbol duration in each symbol of a subframe. Timelines 400, 402 both depict symbols representing a TTI for ULL physical downlink control channel (uPDCCH) and/or ULL physical downlink shared channel (uPDSCH) and symbols representing a TTI including ULL physical uplink control channel (uPUCCH) and/or ULL physical uplink shared channel (uPUSCH). In timelines 400, 14 symbols are shown within a given subframe (e.g., for normal CP), and in timelines 402, 12 symbols are shown within a given subframe (e.g., for extended CP). In either case, lower latency is achieved in ULL by utilizing symbol-based TTIs. In other examples, a TTI may be two or more symbols, a slot of a subframe (where a subframe includes two slots), etc. In addition, HARQ process response time can be 3 symbols (or 4 symbols, 3 dual-symbols, 3 slots, etc.). In the depicted example, uPDCCH/uPDSCH is sent in symbol 0, and HARQ is processed and is sent in symbol 4, etc. in the subframe. Moreover, in accordance with aspects described herein, some symbols within a given subframe can be allocated for downlink communications (e.g., uPDCCH/uPDSCH) while other symbols are allocated for uplink communications (e.g., uPUCCH/uPUSCH).

Figure 5:
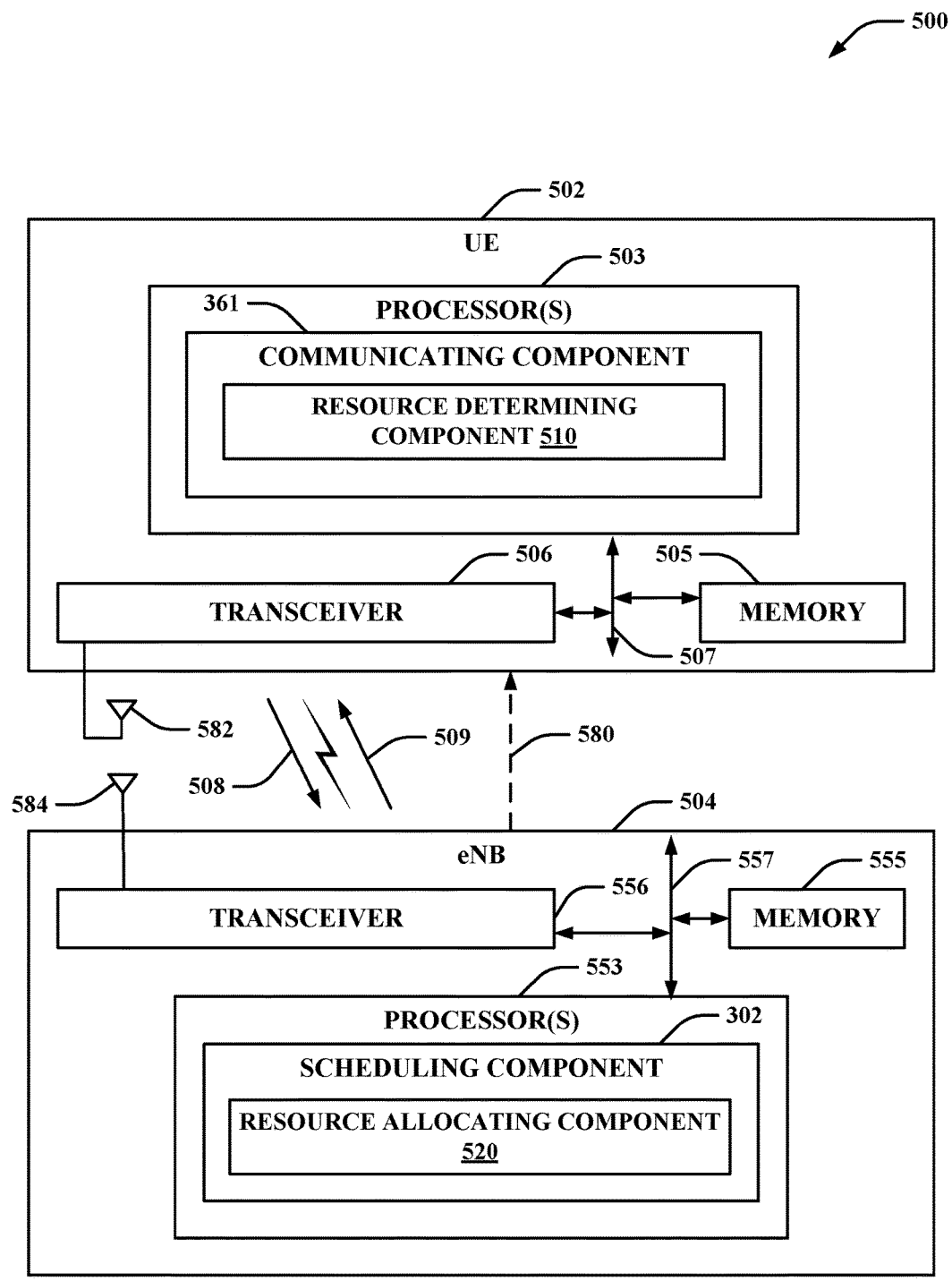
FIG. 5 is a diagram illustrating an example of a system for communicating in a low latency wireless communication technology in accordance with aspects described herein.
Figure 6:
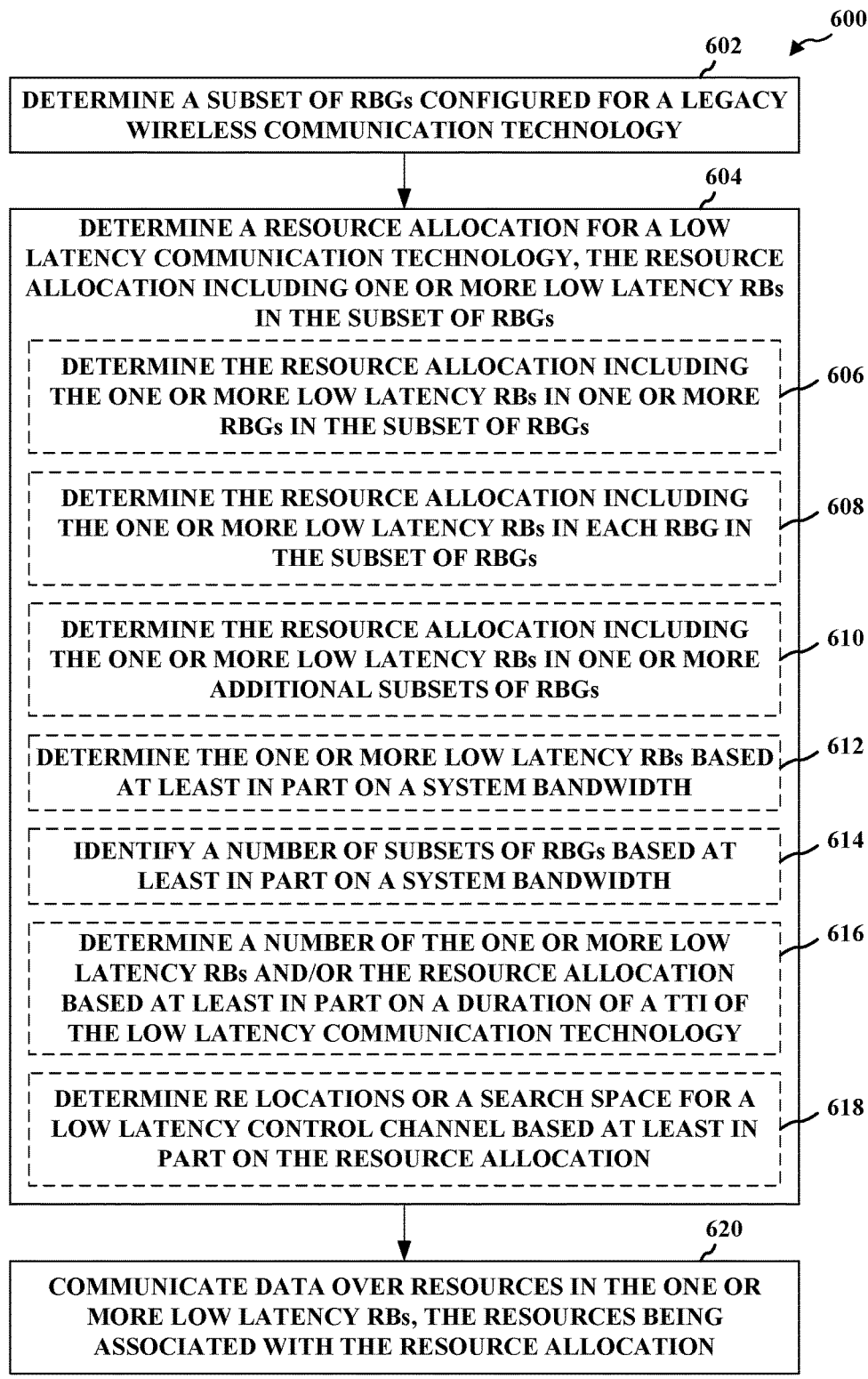
FIG. 6 is a flow chart of an example of a method for communicating in a low latency wireless communication technology in accordance with aspects described herein.
Figure 7:
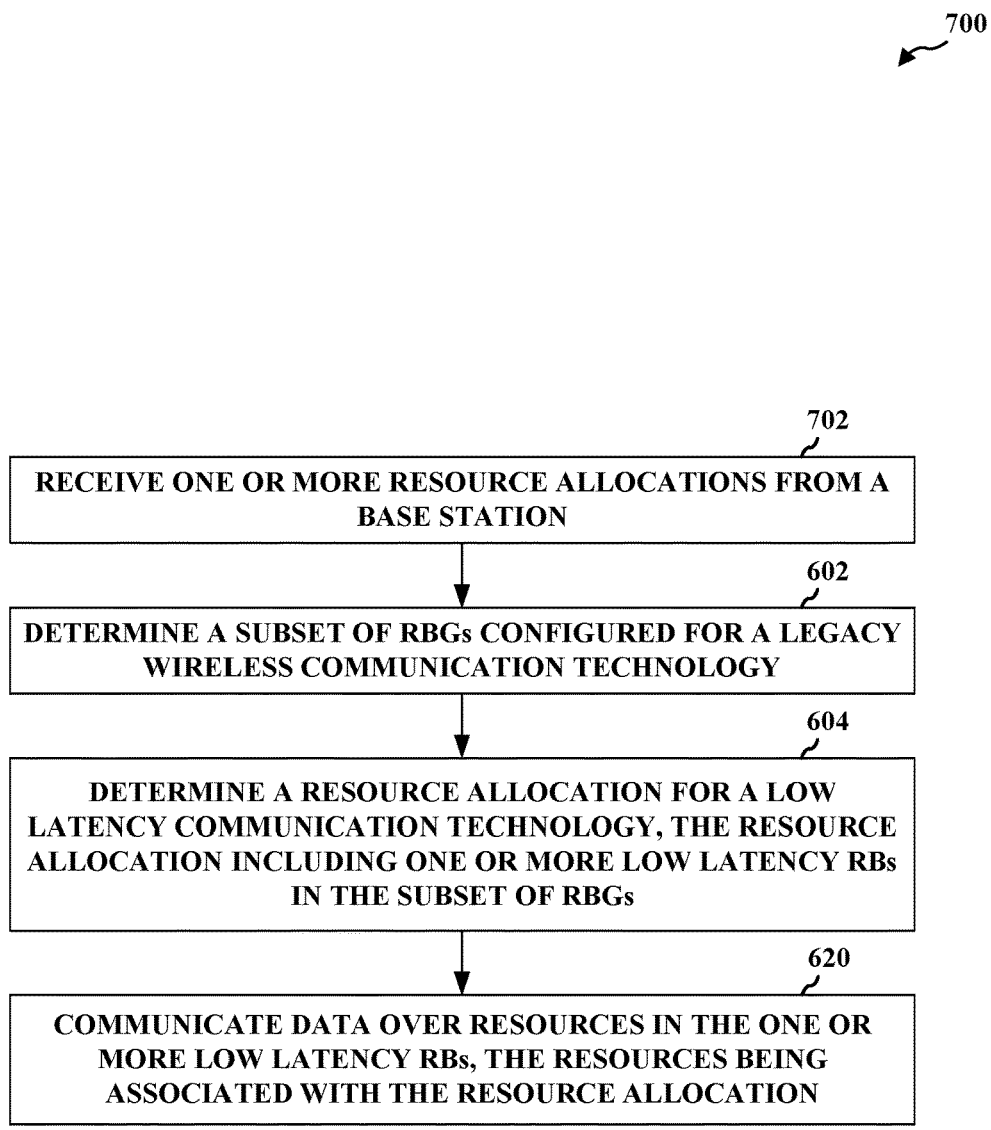
FIG. 7 is a flow chart of an example of a method for communicating, by a user equipment, in a low latency wireless communication technology in accordance with aspects described herein.
Figure 8:
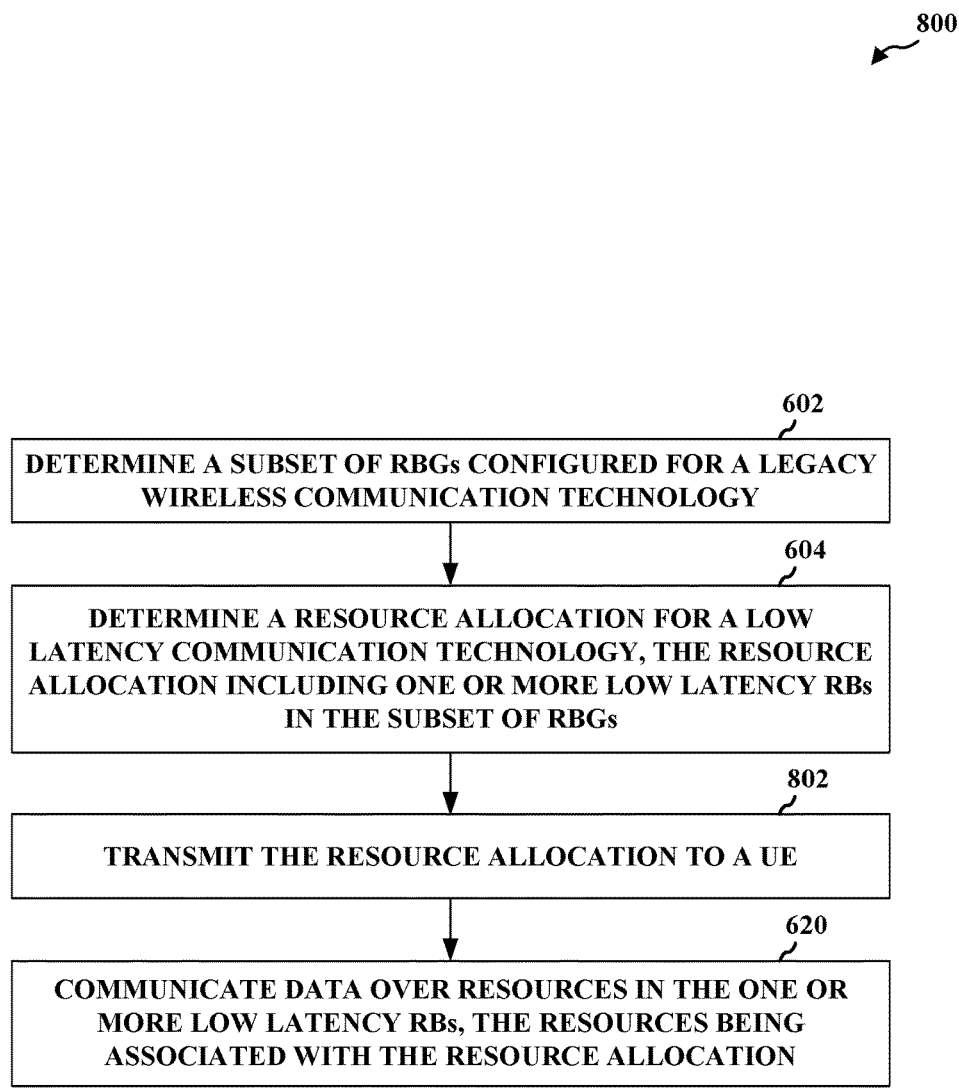
FIG. 8 is a flow chart of an example of a method for communicating, by an evolved Node B, in a low latency wireless communication technology in accordance with aspects described herein.

Referring to FIGS. 5-8, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIGS. 6-8 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

FIG. 5 illustrates an example of a system 500 for scheduling ULL communications. System 500 includes a UE 502 that communicates with an eNB 504 to access a wireless network, examples of which are described in FIGS. 1-3 (e.g., access points 105, eNB 204, small cell eNB 208, eNB 310, UEs 115, 206, 350, etc.), above. In an aspect, eNB 504 and UE 502 may have established one or more downlink channels over which to communicate via downlink signals 509, which can be transmitted by eNB 504 (e.g., via transceiver 556) and received by UE 502 (e.g., via transceiver 506) for communicating control and/or data messages (e.g., in signaling) from the eNB 504 to the UE 502 over configured communication resources. Moreover, for example, eNB 504 and UE 502 may have established one or more uplink channels over which to communicate via uplink signals 508, which can be transmitted by UE 502 (e.g., via transceiver 506) and received by eNB 504 (e.g., via transceiver 556) for communicating control and/or data messages (e.g., in signaling) from the UE 502 to the eNB 504 over configured communication resources. As described further herein, for example, eNB 504 may communicate a resource grant 580 that can indicate resources over which the UE 502 is to communicate (e.g., transmit or receive) data with eNB 504, where the resources can correspond to a legacy communication technology, a ULL communication technology, as described. For example, resources related to a ULL communication technology can relate to a ULL timeline (e.g., a timeline having a TTI that is less than a subframe in duration, such as the timelines 400, 402 in FIG. 4).

In an aspect, UE 502 may include one or more processors 503 and/or a memory 505 that may be communicatively coupled, e.g., via one or more buses 507, and may operate in conjunction with or otherwise implement a communicating component 361 for communicating using a ULL communication technology based on one or more resource grants. For example, the various operations related to communicating component 361 may be implemented or otherwise executed by one or more processors 503 and, in an aspect, can be executed by a single processor, while in other aspects, different ones of the operations may be executed by a combination of two or more different processors. For example, in an aspect, the one or more processors 503 may include any one or any combination of a modem processor, or a baseband processor, or a digital signal processor, or an application specific integrated circuit (ASIC), or a transmit processor, receive processor, or a transceiver processor associated with transceiver 506. Further, for example, the memory 505 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 503. Moreover, memory 505 or computer-readable storage medium may be resident in the one or more processors 503, external to the one or more processors 503, distributed across multiple entities including the one or more processors 503, etc.

In particular, the one or more processors 503 and/or memory 505 may execute actions or operations defined by communicating component 361 or its subcomponents. For instance, the one or more processors 503 and/or memory 505 may execute actions or operations defined by a resource determining component 510 for determining resources over which to communicate with an eNB using a low latency communication technology. In an aspect, for example, resource determining component 510 may include hardware (e.g., one or more processor modules of the one or more processors 503) and/or computer-readable code or instructions stored in memory 505 and executable by at least one of the one or more processors 503 to perform the specially configured resource determining operations described herein.

Similarly, in an aspect, eNB 504 may include one or more processors 553 and/or a memory 555 that may be communicatively coupled, e.g., via one or more buses 557, and may operate in conjunction with or otherwise implement a scheduling component 302 for generating resource grants for one or more UEs for ULL wireless communications. For example, the various functions related to scheduling component 302 may be implemented or otherwise executed by one or more processors 553 and, in an aspect, can be executed by a single processor, while in other aspects, different ones of the functions may be executed by a combination of two or more different processors, as described above. In one example, the one or more processors 553 and/or memory 555 may be configured as described in examples above with respect to the one or more processors 503 and/or memory 505 of UE 502.

In an example, the one or more processors 553 and/or memory 555 may execute actions or operations defined by scheduling component 302 or its subcomponents. For instance, the one or more processors 553 and/or memory 555 may execute actions or operations defined by a resource allocating component 520 for allocating resources to a UE over which to communicate with the eNB 504 using a low latency communication technology. In an aspect, for example, resource allocating component 520 may include hardware (e.g., one or more processor modules of the one or more processors 553) and/or computer-readable code or instructions stored in memory 555 and executable by at least one of the one or more processors 553 to perform the specially configured resource allocating operations described herein.

In an example, transceivers 506, 556 may be configured to transmit and receive wireless signals through one or more antennas 582, 584 and may generate or process the signals using one or more RF front end components (e.g., power amplifiers, low noise amplifiers, filters, analog-to-digital converters, digital-to-analog converters, etc.), one or more transmitters, one or more receivers, etc. In an aspect, transceivers 506, 556 may be tuned to operate at specified frequencies such that UE 502 and/or eNB 504 can communicate at a certain frequency. In an aspect, the one or more processors 503 may configure transceiver 506 and/or one or more processors 553 may configure transceiver 556 to operate at a specified frequency and power level based on a configuration, a communication protocol, etc. to communicate uplink signals 508 and/or downlink signals 509, respectively, over related uplink or downlink communication channels.

In an aspect, transceivers 506, 556 can operate in multiple bands (e.g., using a multiband-multimode modem, not shown) such to process digital data sent and received using transceivers 506, 556. In an aspect, transceivers 506, 556 can be multiband and be configured to support multiple frequency bands for a specific communications protocol. In an aspect, transceivers 506, 556 can be configured to support multiple operating networks and communications protocols. Thus, for example, transceivers 506, 556 may enable transmission and/or reception of signals based on a specified modem configuration.

FIG. 6 illustrates an example of a method 600 for determining (e.g., by an eNB, UE, etc.) a resource allocation in a low latency communication technology. In method 600, blocks indicated as dashed boxes represent optional steps. In addition, as described in further detail below, the resource determining component 510 and/or resource allocating component 520 can perform many of the actions described in method 600. In particular, the resource allocating component 520 can perform the actions in determining resources for allocating to one or more UEs, such as UE 502, and/or the resource determining component 510 can perform the actions in determining resources that have been allocated to the UE 502 by one or more eNBs (e.g., eNB 504).

At Block 602, the UE or eNB may determine a subset of RBGs configured for a legacy wireless communication technology. In an aspect, resource determining component 510, e.g., in conjunction with processor(s) 503, memory 505, and/or transceiver 506, may determine the resource allocation in the legacy wireless communication technology. In another aspect, resource allocating component 520, e.g., in conjunction with processor(s) 553, memory 555, and/or transceiver 556, may determine the resource allocation in the legacy wireless communication technology.

For example, resource allocating component 520 may determine the resource allocation for UE 502, and can communicate the resource allocation over a control channel, common search space, etc. In this example, resource determining component 510 can determine the resource allocation based at least in part on at least one of information received from eNB 504 in the resource allocation, one or more known parameters regarding the resource allocation, and/or the like. For example, the resource allocation for the low latency communication technology may correspond to known RBGs and/or RBs thereof. In LTE, for example, multiple downlink resource allocation types can be used, which are indicated as downlink resource allocation types 0, 1, and 2. For example, downlink resource allocation types 0 and 1 utilize known RBGs in allocating resources to UEs.

For example, downlink resource allocation type 0 in LTE can be based on RBGs where each RBG can include a number of consecutive RBs (P). For example, P can be selected based on the LTE system bandwidth based on the following:

| System Bandwidth (in RBs) | RBG size (# of RBs (P)) |
| --- | --- |
| <=10 | 1 |
| 11-26 | 2 |
| 27-63 | 3 |
| 64-110 | 4 |

For example, for a 20 MHz system bandwidth, 100 RBs can be allocated. In this example, each RBG can include 4 consecutive RBs based on the table above (e.g., starting with RBs 0-3 as RBG 1, RBs 4-7 as RBG 2, etc.). Thus, there are 25 available RBGs (e.g., system bandwidth divided by the RBG size), and a 25-bit bitmap can be used to indicate which RBG out of the 25 RBGs are allocated to a UE to receive downlink communications from an eNB in LTE wireless communications. In this example, resource determining component 510 may determine the resource allocation based at least in part on at least one of receiving the bitmap from eNB 504, where the bitmap specifies the subset of RBGs allocated to the UE 502, based on an indication that downlink resource allocation type 0 is being used to allocate the resources, based on determining the system bandwidth, etc. Resource allocating component 520 can generate this bitmap for the UE 502 in scheduling resources over the subset of RBGs for the UE and/or other UEs, and can communicate the bitmap to the UE 502. For example, resource allocating component 520 can determine which RBGs and/or how many RBGs to allocated to the UE and/or other UEs based on various considerations (e.g., a desired bandwidth as determined based on a buffer status report from the UE, a substantially equal allocation of RBGs for all UEs served by eNB 504, etc.).

In another example, downlink resource allocation type 1 in LTE can be based on RBGs as well, where a subset of RBGs can be assigned to a UE for receiving downlink communications from the eNB 504. As described above, downlink resource allocation type 1 can be associated with three fields: a first field with ceiling(log 2(P)) bits used to indicate a selected RBG subset among RBG subsets (e.g., 2 bits for 20 megahertz (MHz)); a second field with one bit used to indicate a shift of the resource allocation span within a subset; and a third field used to indicate a bitmap where each bit in the bitmap addresses a single virtual RB in the selected RBG subset such that the most significant bit to least significant bit of the bitmap are mapped to the virtual RBs in increasing frequency order. The portion of the bitmap used to address virtual RBs in a selected RBG subset has size N_DL/\RB/P–ceiling(log 2(P))–(e.g., 22 bits for 20 MHz), where N_DL/\RB is DL system bandwidth in terms of a number of RBs.

Figure 9A:
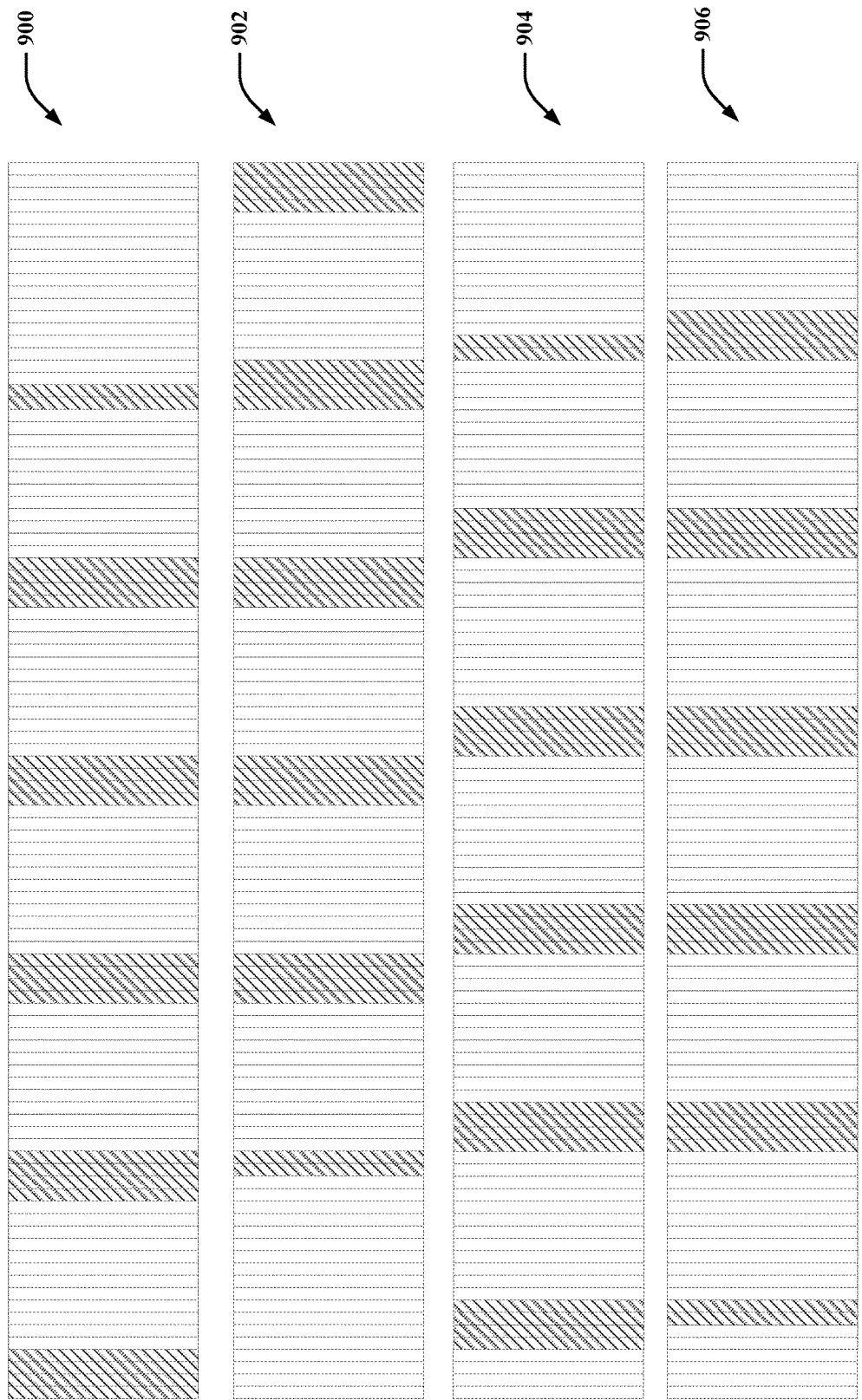
FIGS. 9a and 9b are diagrams of example resource allocations for long term evolution communications in accordance with aspects described herein.
Figure 9B:
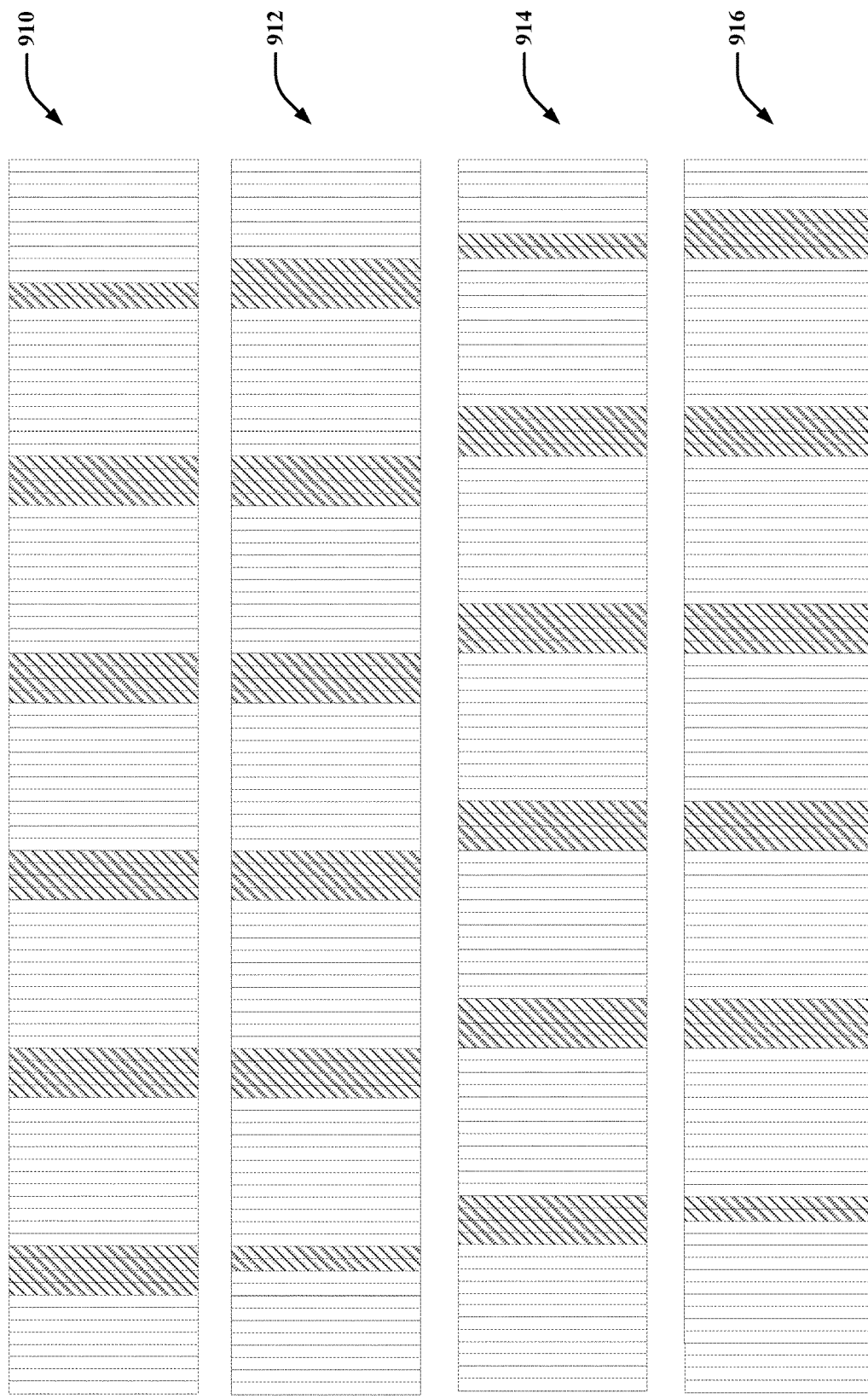

Examples resource allocations for downlink resource allocation type 1 are shown in FIGS. 9a and 9b. For example, FIG. 9a illustrates a resource allocation 900 where the first field 2-bit=00, the second field 1-bit=0, and the 22-bit bitmap indicates RBs 0, 1, 2, 3, 16, 17, 18, 19, 32, 33, 34, 35, . . . , 80, 81, a resource allocation 902 where the first field 2-bit=00, and the second field 1-bit=1, a resource allocation 904 where the first field 2-bit=01, and the second field 1-bit=0, and a resource allocation 906 where the first field 2-bit=01, and the second field 1-bit=1. FIG. 9b illustrates a resource allocation 910 where the first field 2-bit=10, the second field 1-bit=0, a resource allocation 912 where the first field 2-bit=10, and the second field 1-bit=1, a resource allocation 914 where the first field 2-bit=11, and the second field 1-bit=0, and a resource allocation 916 where the first field 2-bit=11, and the second field 1-bit=1.

In this example, resource determining component 510 in FIG. 5 may determine the resource allocation based on one or more related parameters indicated in a resource allocation from the eNB 504 (e.g., downlink resource allocation type 0 and/or related parameters, such as a bitmap indicating a set of RBGs assigned to the UE, downlink resource allocation type 1 and/or related parameters, such as a first field 2-bit, second field 1-bit, and/or bitmap, as shown in examples above, etc.). As described, resource allocating component 520 can generate the resource allocation to include these parameters when scheduling the UE 502 (and/or other UEs) with resources for communications, and can communicate the resource allocation to UE 502. In an example, the resource allocation bitmap can be valid for a period of time, such as an period of time indicated in the resource allocation, a period of time until eNB 504 communicates another bitmap, a period of time while the UE 502 is communicating with eNB 504 (e.g., in connected mode), and/or the like.

At Block 604, the UE or eNB may determine a resource allocation for a low latency communication technology, the resource allocation including one or more low latency RBs in the subset of RBGs. In an aspect, resource determining component 510, e.g., in conjunction with processor(s) 503, memory 505, and/or transceiver 506, may determine the resource allocation for the low latency communication technology, the resource allocation including one or more low latency RBs in the subset of RBGs. In another aspect, resource allocating component 520, e.g., in conjunction with processor(s) 553, memory 555, and/or transceiver 556, may determine the resource allocation for the low latency communication technology, the resource allocation including one or more low latency RBs in the subset of RBGs.

For example, for the low latency communication technology (e.g., ULL LTE), block-based resource allocation can be used where each block includes a number of consecutive or non-consecutive RBs over the system bandwidth. In one example, each block can be around 25 RBs such that in a 20 MHz system, there can be four blocks for allocating to each of one or more UEs, each block being 5 MHz. In addition, the low latency communication technology may co-exist with the legacy communication technology (e.g., in 1ms subframe transmissions) such that one or more RBs, RBGs, blocks, etc. may be fully or partially allocated to UEs using the legacy communication technology or the low latency communication technology. Thus, resource determining component 510 and/or resource allocating component 520 can determine the resource allocation for the low latency wireless communication technology to better co-exist with legacy data channels (e.g., physical downlink shared channel (PDSCH) in LTE), to provide better frequency diversity, etc. In an example, resource determining component 510 and/or resource allocating component 520 may determine the resource allocation by determining block sizes for ULL communications based on the system bandwidth. In another example, resource determining component 510 and/or resource allocating component 520 may determine the resource allocation by determining block sizes to be substantially equal in size. Moreover, in an example, resource determining component 510 and/or resource allocating component 520 may determine the low latency RBs to be consecutive and/or not consecutive (e.g., some or none of the RBs may be consecutive) with one another over the system bandwidth, within one or more RBGs, etc.

In determining the resource allocation at Block 604, the UE or eNB may optionally, at Block 606, determine the resource allocation including the one or more low latency RBs in one or more RBGs in the subset of RBGs. In an aspect, resource determining component 510, e.g., in conjunction with processor(s) 503, memory 505, and/or transceiver 506, may determine the resource allocation including the one or more low latency RBs in one or more RBGs in the subset of RBGs. In another aspect, resource allocating component 520, e.g., in conjunction with processor(s) 553, memory 555, and/or transceiver 556, may determine the resource allocation including the one or more low latency RBs in one or more RBGs in the subset of RBGs. In this regard, the resource allocation for the low latency communication technology may utilize at least a subset of the RBGs of those used in the legacy communication technology.

Figure 10:
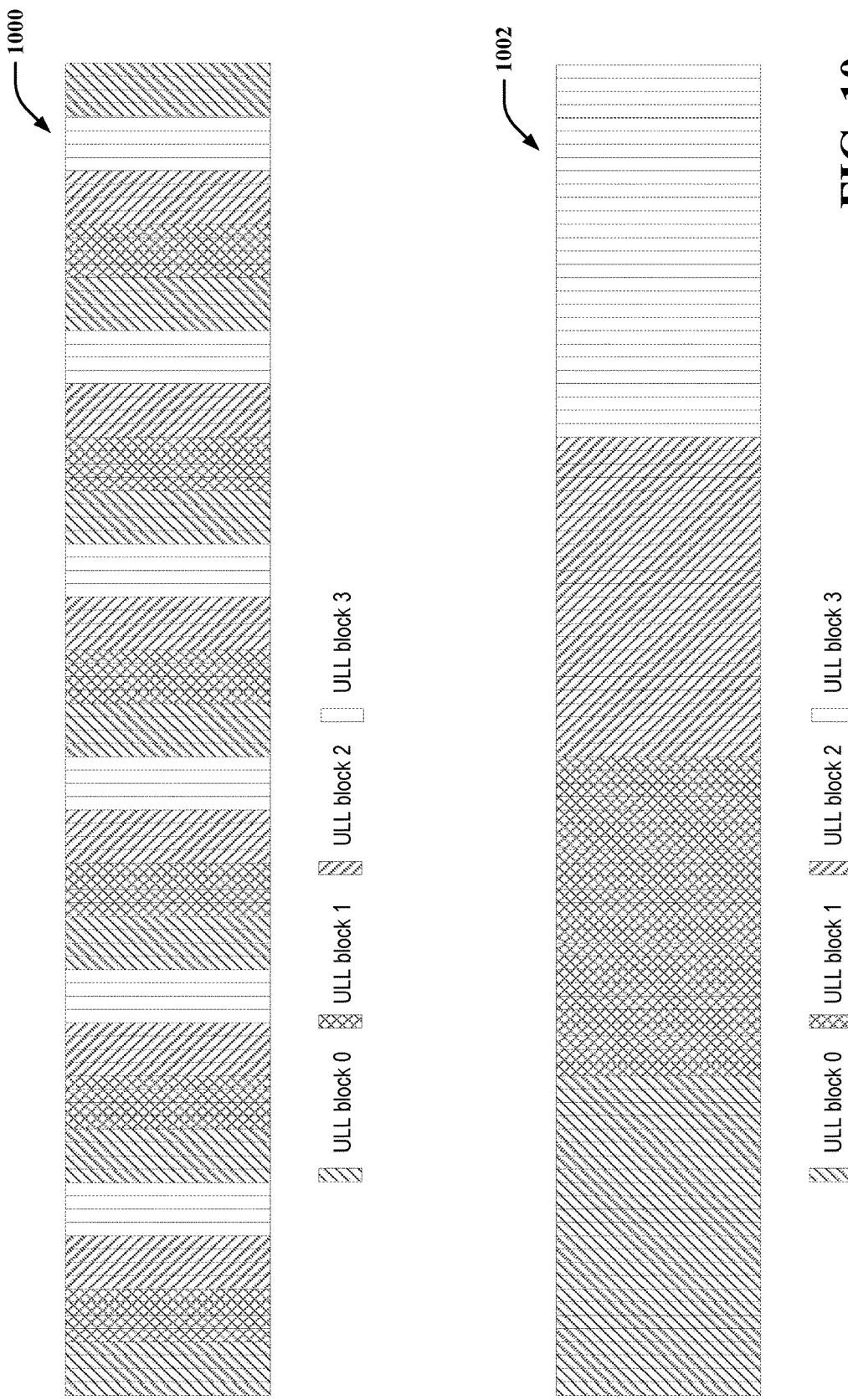
FIG. 10 is a diagram of an example resource allocation for low latency communications in accordance with aspects described herein.

For example, in 20 MHz LTE where the resource allocation determined at Block 602 includes RBG subset 0 having RBGs {0, 4, 8, 12, 16, 20, 24}, the resource allocation determined at Block 606 for the low latency communication technology may be divided into one or more ULL blocks. For example, the resource allocation may be divided into two ULL blocks including ULL block 0 with RBGs {0, 4, 8} (12 RBs), and ULL block 1 with RBGs {12, 16, 20, 24} (16 RBs). In another example, the resource allocation may include one ULL block including all of the RBGs in the subset, etc. An example resource allocation 1000 is shown in FIG. 10 where block 0 for ULL resource allocation can include RBGs {0, 4, 8, 12, 16, 20, 24}, block 1 for ULL resource allocation can include RBGs {1, 5, 9, 13, 17, and 21}, block 2 for ULL resource allocation can include RBGs {2, 6, 10, 14, 18, and 22}, and block 3 for ULL resource allocation can include RBGs {3, 7, 11, 15, 19, and 23}.

In an example, resource determining component 510 and/or resource allocating component 520 may determine the resource allocation as including the low latency RBs in ULL blocks in this regard based on the RBGs specified in the legacy resource allocation (e.g., such that the ULL blocks align with at least some of the RBs in the RBGs specified in the legacy resource allocation). As described, for example, resource determining component 510 and/or resource allocating component 520 may determine the resource allocation to include one or more subsets (e.g., one or more ULL blocks) of one or more RBG subsets. For example, resource determining component 510 may determine the resource allocation based on known or configured allocations of ULL blocks among one or more RBG subsets. For example, the ULL allocations may be indexed such that ULL block 0 corresponds to RBGs {0, 4, 8}, ULL block 1 corresponds to RBGs {12, 16, 20, 24}, ULL block 2 corresponds to RBGs {1, 5, 9}, ULL block 3 corresponds to RBGs {13, 17, 21}, ULL block 4 corresponds to RBGs {2, 6, 10}, ULL block 5 corresponds to RBGs {14, 18, 22}, etc. Thus, in an example, resource allocating component 520 may specify a value of the ULL block structure(s) allocated to UE 502 (e.g., using an integer index value, a bitmap where each bit corresponds to a ULL block, etc.), and resource determining component 510 may receive the value and accordingly determine the ULL block(s) to use in receiving downlink communications from eNB 504. In another example, resource determining component 510 may determine the ULL block structure for UE 502 based on the resources configured for legacy communications. For example, resource determining component 510 can determine one or more associations between ULL block(s) and legacy RBG group(s) (e.g., based on a configuration). In a specific example, resource determining component 510 may determine ULL blocks 0 and 1 as related to legacy RBG 0, and thus may determine an allocation of ULL blocks 0 and 1 where RBG 0 is configured for UE 502 in the legacy communication technology. The correlation between ULL blocks and RBGs may be configured by UE 502, and/or determined by resource determining component 510 based on the legacy RBG and additional information specified by resource allocating component 520 in a resource allocation, such as a number of ULL blocks to utilize (2 in this example). Moreover, in an example, resource allocating component 520 may specify an allocation type in the resource allocation to indicate that ULL blocks are to be utilized. In another example, resource allocating component 520 may determine the low latency RBs to allocate to UE 502 in this regard (based on the subset of legacy RBGs assigned to UE 502 and determining one or more ULL blocks), and may accordingly indicate the ULL resource allocation (e.g., in a bitmap, allocation type, or other parameter that specifies the ULL block(s), RBGs, low latency RBs, etc.).

In an example, in determining the resource allocation at Block 604, the UE or eNB may optionally, at Block 608, determine the resource allocation including the one or more low latency RBs in each RBG in the subset of RBGs. In an aspect, resource determining component 510, e.g., in conjunction with processor(s) 503, memory 505, and/or transceiver 506, may determine the resource allocation including the one or more low latency RBs in each RBG in the subset of RBGs. In another aspect, resource allocating component 520, e.g., in conjunction with processor(s) 553, memory 555, and/or transceiver 556, may determine the resource allocation including the one or more low latency RBs in each RBG in the subset of RBGs.

In this example, resource determining component 510 determines the resource allocation for the low latency communication technology to include the low latency RBs as the same RBs in the subset of RBGs configured for legacy wireless communications. Similarly, in this example, resource determining component 510 may be configured to determine the low latency RBs as one or more ULL blocks including the same as the RBs in the subset of legacy RBGs. For example, resource determining component 510 can determine the low latency RBs in this regard based on receiving a configuration from resource allocating component 520 indicating to operate in this regard (e.g., where the resource allocation may include a corresponding allocation type that indicates the low latency RBs as one or more ULL blocks including the same RBs as the subset of legacy RBGs). In addition, as described, resource allocating component 520 may determine the low latency RBs to allocate to UE 502 in this regard (based on the subset of legacy RBGs assigned to UE 502), and may accordingly indicate the ULL resource allocation (e.g., in a bitmap, allocation type, or other parameter that specifies the RBGs, low latency RBs, etc.).

In an example, in determining the resource allocation at Block 604, the UE or eNB may optionally, at Block 610, determine the resource allocation including the one or more low latency RBs in one or more additional subsets of RBGs. In an aspect, resource determining component 510, e.g., in conjunction with processor(s) 503, memory 505, and/or transceiver 506, may determine the resource allocation including the one or more low latency RBs in one or more additional subsets of RBGs. In another aspect, resource allocating component 520, e.g., in conjunction with processor(s) 553, memory 555, and/or transceiver 556, may determine the resource allocation including the one or more low latency RBs in one or more additional subsets of RBGs.

For example, resource determining component 510 may determine the one or more additional subsets of RBGs to include one or more consecutive subsets. For example, one or more ULL blocks can be defined to include one or more consecutive RBGs (e.g., RBGs adjacent in frequency). An example resource allocation 1002 in a 20 MHz system bandwidth is shown in FIG. 10 where block 0 for ULL resource allocation can include RBGs {0, 1, 2, 3, 4, 5} having a total of 24 RBs, block 1 for ULL resource allocation can include RBGs {6, 7, 8, 9, 10, 11} having a total of 24 RBs, block 2 for ULL resource allocation can include RBGs {12, 13, 14, 15, 16, 17} having a total of 24 RBs, and block 3 for ULL resource allocation can include RBGs {18, 19, 20, 21, 22, 23, 24} having a total of 28 RBs.

As similarly described above, in one example, resource determining component 510 may determine the resource allocation of one or more low latency RBs as defined in one or more ULL blocks. For example, resource determining component 510 may determine the resource allocation based on one or more known or configured parameters at UE 502 and/or additional information from resource allocating component 520. For example, resource determining component 510 may know or may be configured with the correlation between the ULL block indices and corresponding subsets of RBGs. In this example, resource allocating component 520 can allocate ULL resources for the UE 502 by specifying a ULL block index. In addition, as described, resource allocating component 520 may determine the low latency RBs to allocate to UE 502 in this regard (as including RBs in a subset of continuous RBGs), and may accordingly indicate the ULL resource allocation (e.g., in a bitmap, allocation type, or other parameter that specifies the RBGs, low latency RBs, etc.). For example, resource allocating component 520 may include the allocation type in the resource allocation that indicates allocation based on continuous RBGs.

In an example, in determining the resource allocation at Block 604, the UE or eNB may optionally, at Block 612, determine the one or more low latency RBs based at least in part on a system bandwidth. In an aspect, resource determining component 510, e.g., in conjunction with processor(s) 503, memory 505, and/or transceiver 506, may determine the one or more low latency RBs based at least in part on a system bandwidth. In another aspect, resource allocating component 520, e.g., in conjunction with processor(s) 553, memory 555, and/or transceiver 556, may determine the one or more low latency RBs based at least in part on a system bandwidth.

For example, resource determining component 510 and/or resource allocating component 520 may determine the one or more low latency RBs as part of the one or more RBG subsets where the RBGs or RBG subsets may be different (e.g., of different size) based on the system bandwidth, as described. As described, an association between system bandwidth and RBG or RBG subset parameters may be known or otherwise configured at the UE 502 and/or eNB 504 such that resource determining component 510 and/or resource allocating component 520 can determine one or more parameters of the RBG or RBG subsets for determining low latency RBs based on the system bandwidth.

Similarly, in an example, in determining the resource allocation at Block 604, the UE or eNB may optionally, at Block 614, identify a number of subsets of RBGs based at least in part on a system bandwidth. In an aspect, resource determining component 510, e.g., in conjunction with processor(s) 503, memory 505, and/or transceiver 506, may identify a number of subsets of RBGs based at least in part on a system bandwidth. In another aspect, resource allocating component 520, e.g., in conjunction with processor(s) 553, memory 555, and/or transceiver 556, may identify a number of subsets of RBGs based at least in part on a system bandwidth. As described, the subset of RBGs can be defined based on the system bandwidth, and/or based on the number of RBs to be included in each RBG (which may also be based on the system bandwidth). Thus, resource determining component 510 and/or resource allocating component 520 may determine the number of subsets of RBGs and/or the subsets of RBGs based on the system bandwidth (e.g., based on determining the number of subsets corresponding to the system bandwidth in a configured table or mapping, etc.).

In an example, in determining the resource allocation at Block 604, the UE or eNB may optionally, at Block 616, determine a number of the one or more low latency RBs and/or the resource allocation based at least in part on a TTI of the low latency communication technology. In an aspect, resource determining component 510, e.g., in conjunction with processor(s) 503, memory 505, and/or transceiver 506, may determine a number of the one or more low latency RBs and/or the resource allocation based at least in part on a TTI of the low latency communication technology. In another aspect, resource allocating component 520, e.g., in conjunction with processor(s) 553, memory 555, and/or transceiver 556, may determine a number of the one or more low latency RBs and/or the resource allocation based at least in part on a TTI of the low latency communication technology.

For example, a one symbol TTI may correlate to a first number of low latency RBs for the resource allocation (e.g., a number of RBGs per ULL block or otherwise) while a two symbol TTI may correlate to a second number of low latency RBs for the resource allocation. In another example, a one symbol TTI may correlate to a resource allocation type while a two symbol TTI may correlate to another resource allocation type (e.g., where ULL blocks correspond to non-contiguous RBG subsets based on legacy RBG allocation as one allocation type or to contiguous RBG subsets as another allocation type). Thus, in one example, resource determining component 510 and/or resource allocating component 520 can determine the number of low latency RBs and/or the resource allocation based on the resource allocation type that corresponds to the TTI duration.

In another example, other factors may impact resource allocation types for low latency RBs, such as whether cell-specific reference signal (CRS), demodulation reference signal (DM-RS), etc. are transmitted in the TTI. For example, low latency RBs can be allocated or otherwise determined as allocated as a first type (e.g., frequency-distributed) for CRS based transmission, and/or as a second type (frequency-localized) for DM-RS based transmission. In addition, for example, two or more resource allocation types may be used. Moreover, in an example, resource determining component 510 and/or resource allocating component 520 may determine the resource allocation based at least in part on the indicated resource allocation type, a downlink control information (DCI) format, a subframe index, a type of channel information feedback, etc. In an example, the resource allocation types can be mapped or otherwise associated with one or more of a downlink control information (DCI) format, a subframe index, a type of channel information feedback, etc. in a configuration received or generated by the UE 502, eNB 504, etc.

In an example, in determining the resource allocation at Block 604, the UE or eNB may optionally, at Block 618, determine resource element (RE) locations or a search space for a low latency control channel based at least in part on the resource allocation. In an aspect, resource determining component 510, e.g., in conjunction with processor(s) 503, memory 505, and/or transceiver 506, may determine RE locations or a search space for a low latency control channel based at least in part on the resource allocation. In another aspect, resource allocating component 520, e.g., in conjunction with processor(s) 553, memory 555, and/or transceiver 556, may determine RE locations for a low latency control channel based at least in part on the resource allocation.

For example, based on a resource allocation type (e.g., where ULL blocks correspond to non-contiguous RBG subsets based on legacy RBG allocation as one allocation type or to contiguous RBG subsets as another allocation type), resource determining component 510 can determine RE locations for decoding a low latency control channel (e.g., uPDCCH), and thus resource allocating component 520 may allocate the control channel resources for UE 502 based on a specified low latency allocation type. Similarly, in an example, two or more decoding candidates for a search space for uPDCCH may be associated with different low latency allocation types (e.g., a first decoding candidate of uPDCCH may have some REs in RBG {0, 4, 8, 12} and a second decoding candidate of uPDCCH may have some REs in RBG {0, 1, 2, 3}). Moreover, in these examples, the resource allocating component 520 can accordingly determine the RE locations as described, and can transmit the uPDCCH in the determined RE locations such that the UE 502 can receive the control channel communications based on resource determining component 510 determining the RE locations associated with the search space.

At Block 620, the UE or eNB may communicate data over resources in the one or more low latency RBs, the resources being associated with the resource allocation. In an aspect, communicating component 361, e.g., in conjunction with processor(s) 503, memory 505, and/or transceiver 506, may communicate data over resources in the one or more low latency RBs, the resources being associated with the resource allocation. In another aspect, scheduling component 302, e.g., in conjunction with processor(s) 553, memory 555, and/or transceiver 556, communicate data over resources in the one or more low latency RBs, the resources being associated with the resource allocation.

Thus, for example, resource allocating component 520 may determine the resource allocation as described above, and eNB 504 may communicate downlink data to the UE 502 over the resources defined in the determined resource allocation. Similarly, for example, resource determining component 510 may determine the resource allocation as described above, and UE 502 may accordingly receive the downlink data from the eNB 504 over the resources defined in the determined resource allocation. This is further shown, for example, in FIGS. 7 and 8.

FIG. 7 illustrates an example of a method 700 for determining (e.g., by a UE) a resource allocation in a low latency communication technology.

At Block 702, the UE can receive one or more resource allocations from a base station. In an aspect, resource determining component 510, e.g., in conjunction with processor(s) 503, memory 505, and/or transceiver 506, can receive the one or more resource allocations from the base station (e.g., from eNB 504). For example, the resource determining component 510 can receive the one or more resource allocations over one or more control channels (e.g., PDCCH, uPDCCH, etc.) where the one or more resource allocations can include a resource allocation for a legacy wireless communication technology (which may indicate a subset of RBGs allocated to the UE), a resource allocation for a low latency wireless communication technology (which may indicate one or more RBs, RBGs, ULL blocks, etc., allocated to the UE), and/or the like. In one example, communicating component 361 can search a common search space for resources corresponding to the one or more resource allocations, and resource determining component 510 can determine the resource allocations and/or related parameters based on communications received in the resources determined from the common search space.

Based on the one or more received resource allocations, the UE can determine a subset of RBGs configured for a legacy wireless communication technology at Block 602, determine a resource allocation for a low latency communication technology, the resource allocation including one or more low latency RBs in the subset of RBGs at Block 604, and communicate data over resources in the one or more low latency RBs, the resources being associated with the resource allocation at Block 620, as described in reference to FIG. 6 above.

FIG. 8 illustrates an example of a method 800 for determining (e.g., by an eNB) a resource allocation in a low latency communication technology.

The eNB can determine a subset of RBGs configured for a legacy wireless communication technology at Block 602, and determine a resource allocation for a low latency communication technology, the resource allocation including one or more low latency RBs in the subset of RBGs at Block 604, as described in reference to FIG. 6 above.

At Block 802, the eNB can transmit the resource allocation to a UE. In an aspect, resource allocating component 520, e.g., in conjunction with processor(s) 553, memory 555, and/or transceiver 556, can transmit the resource allocation to the UE (e.g., UE 502), which the UE can receive and use to determine the one or more low latency RBs for communicating using the low latency wireless communication technology, as described. Accordingly, for example, the eNB can also communicate data over resources in the one or more low latency RBs, the resources being associated with the resource allocation at Block 620, as described in reference to FIG. 6 above.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communications, comprising:
   determining a subset of resource block (RB) groups configured for a legacy wireless communication technology having a first transmission time interval (TTI), the first TTI being based on one subframe in duration, wherein each RB group in the subset of RB groups includes one or more RBs;
   identifying a number of RB groups in the subset of RB groups based at least in part on a system bandwidth;
   determining a resource allocation for a low latency communication technology having a second TTI, the second TTI being less than one subframe in duration, the resource allocation including one or more low latency RBs in the number of RB groups in the subset of RB groups; and
   communicating data over resources in the one or more low latency RBs, the low latency RBs being based on the second TTI, and the resources being associated with the resource allocation.

2. The method of claim 1, wherein the resource allocation comprises the one or more low latency RBs in one or more RB groups in the subset of RB groups.

3. The method of claim 1, wherein the resource allocation comprises the one or more low latency RBs in each RB group in the subset of RB groups.

4. The method of claim 1, further comprising determining additional subsets of RB groups configured for the legacy wireless communication technology, wherein the resource allocation comprises the one or more low latency RBs in one or more RB groups in the subset of RB groups and one or more additional RB groups in one or more of the additional subsets of RB groups.

5. The method of claim 4, wherein the one or more RB groups and the one or more additional RB groups are adjacent in frequency.

6. The method of claim 1, further comprising determining the one or more low latency RBs based at least in part on a system bandwidth.

7. The method of claim 1, further comprising determining, based on the subset of RB groups, a decoding candidate for a control channel comprising a plurality of resource elements (REs).

8. The method of claim 7, wherein determining the decoding candidate comprises determining at least a first decoding candidate for the control channel based on REs corresponding to one or more RB groups in the subset of RB groups, and a second decoding candidate for the control channel based on other REs corresponding to one or more other RB groups in the subset of RB groups.

9. The method of claim 1, further comprising determining a number of the one or more low latency RBs based at least in part on the duration of the second TTI.

10. The method of claim 1, further comprising determining the resource allocation based at least in part on the duration of the second TTI.

11. The method of claim 1, wherein the duration of the second TTI is one symbol, two symbols, or one slot of a subframe.

12. The method of claim 1, further comprising determining the resource allocation based at least in part on a received cell-specific reference signal (CRS) or demodulation reference signal (DM-RS).

13. The method of claim 1, further comprising determining the resource allocation based at least in part on an indicated resource allocation type, a downlink control information (DCI) format, a subframe index, a type of channel information feedback, or a combination thereof.

14. An apparatus for wireless communications, comprising:
   a transceiver for communicating one or more wireless signals via one or more antennas;
   a memory configured to store instructions; and
   one or more processors communicatively coupled with the transceiver and the memory, wherein the one or more processors are configured to:
      determine a subset of resource block (RB) groups configured for a legacy wireless communication technology having a first transmission time interval (TTI), the first TTI being based on one subframe in duration, wherein each RB group in the subset of RB groups includes one or more RBs;

identify a number of RB groups in the subset of RB groups based at least in part on a system bandwidth;

determine a resource allocation for a low latency communication technology having a second TTI, the second TTI being less than one subframe in duration, the resource allocation including one or more low latency RBs in the number of RB groups in the subset of RB groups; and communicate data over resources in the one or more low latency RBs, the low latency RBs being based on the second TTI, and the resources being associated with the resource allocation.

15. The apparatus of claim 14, wherein the resource allocation comprises the one or more low latency RBs in one or more RB groups in the subset of RB groups.

16. The apparatus of claim 14, wherein the resource allocation comprises the one or more low latency RBs in each RB group in the subset of RB groups.

17. The apparatus of claim 14, wherein the one or more processors are further configured to determine additional subsets of RB groups configured for the legacy wireless communication technology, wherein the resource allocation comprises the one or more low latency RBs in one or more RB groups in the subset of RB groups and one or more additional RB groups in one or more of the additional subsets of RB groups.

18. The apparatus of claim 17, wherein the one or more RB groups and the one or more additional RB groups are adjacent in frequency.

19. The apparatus of claim 14, wherein the one or more processors are further configured to determine the one or more low latency RBs based at least in part on a system bandwidth.

20. The apparatus of claim 14, wherein the one or more processors are further configured to determine, based on the subset of RB groups, a decoding candidate for a control channel comprising a plurality of resource elements (REs).

21. The apparatus of claim 20, wherein the one or more processors are configured to determine the decoding candidate at least in part by determining at least a first decoding candidate for the control channel based on REs corresponding to one or more RB groups in the subset of RB groups, and a second decoding candidate for the control channel based on other REs corresponding to one or more other RB groups in the subset of RB groups.

22. The apparatus of claim 14, wherein the one or more processors are further configured to determine a number of the one or more low latency RBs based at least in part on the duration of the second TTI.

23. The apparatus of claim 14, wherein the one or more processors are further configured to determine the resource allocation based at least in part on the duration of the second TTI.

24. The apparatus of claim 14, wherein the duration of the second TTI is one symbol, two symbols, or one slot of a subframe.

25. An apparatus for wireless communications, comprising:

means for determining a subset of resource block (RB) groups configured for a legacy wireless communication technology having a first transmission time interval (TTI), the first TTI being based on one subframe in duration, wherein each RB group in the subset of RB groups includes one or more RBs;

means for identifying a number of RB groups in the subset of RB groups based at least in part on a system bandwidth;

means for determining a resource allocation for a low latency communication technology having a second TTI, the second TTI being less than one subframe in duration, the resource allocation including one or more low latency RBs in the number of RB groups in the subset of RB groups; and means for communicating data over resources in the one or more low latency RBs, the low latency RBs being based on the second TTI, and the resources being associated with the resource allocation.

26. The apparatus of claim 25, wherein the resource allocation comprises the one or more low latency RBs in one or more RB groups in the subset of RB groups.

27. A non-transitory computer-readable medium, comprising code executable by one or more processors for wireless communications, the code comprising:

code for determining a subset of resource block (RB) groups configured for a legacy wireless communication technology having a first transmission time interval (TTI), the first TTI being based on one subframe in duration, wherein each RB group in the subset of RB groups includes one or more RBs;

code for identifying a number of RB groups in the subset of RB groups based at least in part on a system bandwidth;

code for determining a resource allocation for a low latency communication technology having a second TTI, the second TTI being less than one subframe in duration, the resource allocation including one or more low latency RBs in the number of RB groups in the subset of RB groups; and code for communicating data over resources in the one or more low latency RBs, the low latency RBs being based on the second TTI, and the resources being associated with the resource allocation.

28. The non-transitory computer-readable medium of claim 27, wherein the resource allocation comprises the one or more low latency RBs in one or more RB groups in the subset of RB groups.

29. The apparatus of claim 25, further comprising means for determining additional subsets of RB groups configured for the legacy wireless communication technology, wherein the resource allocation comprises the one or more low latency RBs in one or more RB groups in the subset of RB groups and one or more additional RB groups in one or more of the additional subsets of RB groups.

30. The non-transitory computer-readable medium of claim 27, further comprising code for determining additional subsets of RB groups configured for the legacy wireless communication technology, wherein the resource allocation comprises the one or more low latency RBs in one or more RB groups in the subset of RB groups and one or more additional RB groups in one or more of the additional subsets of RB groups.

* * * * *